United States Patent [19]

Renner et al.

[11] 4,367,299

[45] Jan. 4, 1983

[54] PROCESS TO MANUFACTURE CROSSLINKED POLYMERS

[75] Inventors: Alfred Renner, Münchenstein; Theobald Haug, Frenkendorf, both of Switzerland

[73] Assignee: Ciba-Geigy Corporation, Ardsley, N.Y.

[21] Appl. No.: 214,308

[22] Filed: Dec. 8, 1980

[30] Foreign Application Priority Data

Dec. 21, 1979 [CH] Switzerland ................. 11404/79

[51] Int. Cl.³ ............................................. C08G 59/56
[52] U.S. Cl. .................................. 523/457; 528/99; 528/108; 528/109; 528/118; 528/121; 528/123; 528/124; 528/367; 528/391; 528/398
[58] Field of Search ............ 260/37 EP; 528/341, 528/89, 90, 99, 108, 109, 118, 121, 123, 124, 367, 391, 398; 523/457

[56] References Cited

U.S. PATENT DOCUMENTS

| | | | |
|---|---|---|---|
| 3,245,940 | 4/1966 | Ronay et al. | 528/108 X |
| 3,312,636 | 4/1967 | Rizzo | 528/108 |
| 4,000,116 | 12/1976 | Renner | 260/47 EP |
| 4,014,955 | 3/1977 | Renner | 260/831 |
| 4,111,909 | 9/1978 | Simons | 528/89 X |
| 4,115,296 | 9/1978 | Andrews | 528/92 |

FOREIGN PATENT DOCUMENTS

| | | |
|---|---|---|
| 1012234 | 12/1965 | United Kingdom . |
| 1159821 | 7/1969 | United Kingdom . |
| 1484441 | 9/1977 | United Kingdom . |

*Primary Examiner*—Earl A. Nielsen
*Attorney, Agent, or Firm*—Luther A. R. Hall

[57] ABSTRACT

The process according to the invention is performed by reaction of epoxide resins with primary and/or secondary polyamines with simultaneous quaternizing by means of aromatic and aliphatic polysulfonic esters, halogen-free organic phosphoric esters, or organic compounds which contain at least 1 chlorine or bromine atom, and which are free from -COOH groups and corresponding salt groups. The crosslinked plastics thus obtained are distinguished by an improved electrical conductivity.

9 Claims, No Drawings

PROCESS TO MANUFACTURE CROSSLINKED POLYMERS

The invention relates to crosslinked plastics which have for plastics an exceptionally high electrical conductivity.

Electrically conducting plastics have already been described in the U.S. Pat. Nos. 4,000,116 and 4,014,955. They are polyethers which contain ionic bonds and which are produced by reaction of Mannich bases, which are derived from phenols, with epoxide compounds containing Cl or Br atoms, or with epoxide compounds and organic compounds containing Cl or Br atoms. Plastics of this type have however the disadvantage that they all too readily swell in water. The products having the highest electrical conductivity dissolve completely in water. Furthermore, the possibilities of processing the starting mixtures are very limited by virtue of the short gelling time.

To be mentioned as further prior art are U.S. Pat. Nos. 4,115,296 and 3,312,636. Amine-cured epoxide resins are described in the former of these two patent specifications. The starting mixtures contain, besides the epoxide compound and the polyamine, fluorine- or chlorine-containing monocarboxylic acid as accelerators. There is no mention of an increase in conductivity of the finished products or of quaternisation, which is understandable since the formation of quaternised products in the case of fluorine-containing monocarboxylic acids was from the outset not to be expected on account of the strong bond of the fluorine atoms.

The U.S. Pat. No. 3,312,636 concerns flameproof epoxide resins produced by reaction of butadiene polymers, which contain epoxide groups, with aromatic diamines and specific phosphoric esters of high halogen content, these esters acting as fire-retarding agents. There is no mention of any increase in the electrical conductivity and it is evident that an increase is not intended to be brought about.

The production process according to the invention now enables plastics having a surprisingly good electrical conductivity to be obtained. These plastics have low water absorption, high conductivity and are largely insensitive to water. The starting mixture surprisingly has a gelling time longer than that of the corresponding mixtures according to U.S. Pat. Nos. 4,000,116 and 4,014,955, and can therefore be more easily processed.

The invention thus relates to a process for producing crosslinked plastics by reacting
(a) an epoxide resin,
(b) a primary and/or secondary, aromatic, aliphatic or heterocyclic polyamine, and
(c) a quaternising agent selected from the group comprising: aromatic and aliphatic polysulfonic acid esters, halogen-free organic phosphoric esters, and organic compounds which contain at least one chlorine or bromine atom in the molecule and which are free from groups of the formula —COOZ in which Z is hydrogen or a metal atom,
(d) optionally in the presence of customary additives for plastics, particularly fillers, and
(e) optionally in the presence of organic solvents,
there being in the starting reaction mixture, to 1 equivalent of glycidyl groups, 0.5 to 1.5 equivalents of hydrogen atoms of the polyamine stated under (b) which are bound to nitrogen, and, to 1 gram atom of N in the reaction mixture, a maximum of 1 gram equivalent of a quaternising agent.

A preferred process according to the invention for producing crosslinked plastics comprises reacting
(a) an epoxide resin containing at least one N atom in the molecule,
(b) a primary and/or secondary, aromatic, aliphatic or heterocyclic polyamine, and
(c) a quaternising agent selected from the group consisting of aromatic and aliphatic polysulfonic esters, halogen-free organic phosphoric esters, and organic compounds which contain at least 2 chlorine or bromine atoms in the molecule, and which are free from groups of the formula —COOZ in which Z is hydrogen or a metal atom,
(d) optionally in the presence of customary additives for plastics, particularly fillers, and
(e) optionally in the presence of organic solvents,
at a temperature of 50° to 150° C., there being in the starting reaction mixture, to 1 equivalent of glycidyl groups, 0.5 to 1.5 equivalents of hydrogen atoms of the polyamine stated under (b) which are bound to nitrogen, and, to 1 gram atom of N in the reaction mixture, a maximum of 1 gram equivalent of a quaternising agent.

According to a further preferred embodiment of the process according to the invention, there is in the starting reaction mixture, to 1 equivalent of glycidyl groups, 1 equivalent of hydrogen atoms of the polyamine stated under (b) which are bound to nitrogen, and, to 1 gram atom of N in the reaction mixture, 1 gram equivalent of a quaternising agent.

The process is preferably performed in the absence of organic solvents.

The starting products mentioned under (a), (b) and (c) for the process according to the invention can be used in each case as a mixture of the respective starting products.

The epoxide resin mentioned under (a) is preferably a compound of the formulae I–II

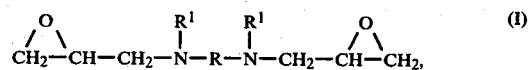

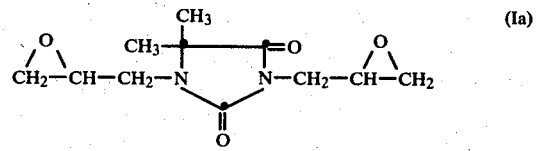

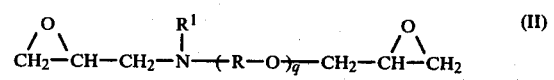

wherein R is an aliphatic radical having 2 to 15 C atoms, or an unsubstituted or substituted aromatic radical having all together 6 to 15 C atoms, $R^1$ is a glycidyl group, an aliphatic radical having 1 to 10 C atoms, or an unsubstituted or substituted aromatic radical having all together 6 to 10 C atoms, and q is the number 0 or 1.

When R and $R^1$ are an aromatic radical, they can be unsubstituted or substituted by 1 or 2 $C_1$-$C_4$-alkyl groups, especially by methyl.

Particularly preferably used as the epoxide resin mentioned under (a) is a compound of the formula Ia or of the formula I or II wherein R is a phenylene group which is unsubstituted or substituted by 1 or 2 methyl groups, or the group

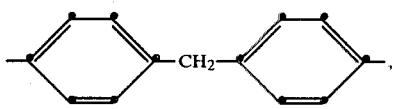

q is the number 0 or 1, and $R^1$ is a glycidyl group.

Examples of preferred epoxide resins of this type are: N,N,N',N'-tetraglycidyl-methylenedianiline, N,N,N',N'-tetraglycidyl-m-phenylenediamine and -p-phenylenediamine, N-diglycidylaniline, -toluidine and -xylidine, and epoxide resins based on 5,5-dimethylhydantion and based on m-, o- and p-aminophenol.

One of the polyamines mentioned under (b) preferably used is a compound of the formula III

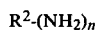 (III), a compound of the formula IV

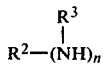 (IV)

or a compound of the formula V

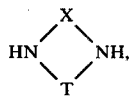 (V)

wherein n is one of the numbers 2, 3 or 4, $R^2$ is an n-valent aliphatic radical having 2 to 15 C atoms, an n-valent, unsubstituted or substituted, aromatic radical having all together 6 to 15 C atoms, or an unsubstituted or substituted heterocyclic radical having all together 3 to 15 C atoms, $R^3$ has the same definition as $R^1$ in the formula I but is not a glycidyl group, and X and T are such organic radicals which can form with the two N atoms a 5- or 6-membered heterocyclic ring.

When $R^2$ and $R^3$ are an aromatic radical or $R^2$ a heterocyclic radical, they can be unsubstituted or substituted by 1 or 2 $C_1$–$C_4$-alkyl groups, especially by methyl.

One of the polyamines mentioned under (b) particularly preferably used is a compound of one of the formulae III to V, wherein n is the number 2, $R^2$ is ethylene, hexamethylene, phenylene or the group

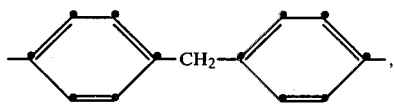

which can be substituted on each of the benzene rings by $C_1$–$C_4$-alkyl, $R^3$ is $C_1$–$C_4$-alkyl or phenyl, and X and T are ethylene.

Examples of these preferred polyamines are 4,4'-diaminodiphenylmethane, m-phenylenediamine, piperazine, 4,4'-diamino-3-ethyldiphenylmethane, 4,4'-diamino-3,3'-diethyldiphenylmethane, compounds of the formulae $CH_3$—NH—$(CH_2)_6$—NH—$CH_3$,

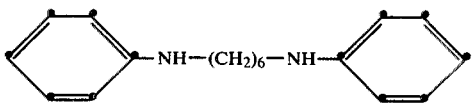

and

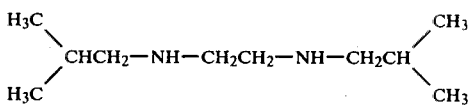

There is preferably used as one of the quaternising agents mentioned under (c) a compound of the formula VI

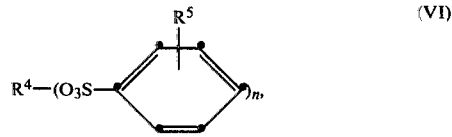 (VI)

a compound of the formula VII

 (VII)

or a compound of the formula VIII

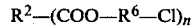

$$R^2—(COO—R^6—Cl)_n \quad (VIII)$$

wherein n is one of the numbers 2, 3 or 4, $R^5$ is hydrogen or has the same meaning as $R^3$ in the formula IV, $R^2$ has the same meaning as in the formula III, $R^4$ is an n-valent aliphatic radical having 2 to 12 C atoms, and $R^6$ is an aliphatic radical having 2 to 8 C atoms, or an unsubstituted or substituted cycloaliphatic radical having all together 5 to 8 C atoms.

When $R^2$ is an aromatic or heterocyclic radical and $R^6$ a cycloaliphatic radical, these can be unsubstituted or substituted by 1 to 2 $C_1$–$C_4$-alkyl groups, especially by methyl.

A quaternising agent mentioned under (c) preferably used is a compound of the formulae VI to VIII, wherein n is 2, $R^2$ is ethylene or tetramethylene, $R^3$ is $C_1$–$C_4$-alkyl, $R^4$ is a bivalent aliphatic radical having 5 or 6 C atoms, $R^5$ is hydrogen and $R^6$ ethylene.

Examples of the quaternising agents are trimethylphosphate, toluene- or benzenesulfonic esters of glycols, for example compounds of the formulae

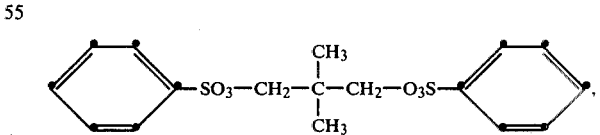

$Cl$—$CH_2OOC$—$(CH_2)_4$—$COOCH_2CH_2$—$Cl$,

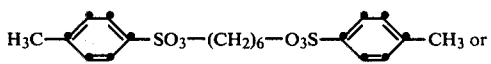

$Cl$—$CH_2CH_2OOC$—$CH_2CH_2$—$COOCH_2CH_2$—$Cl$ and

-continued

OP(OCH$_2$CH$_2$CH$_3$)$_3$. 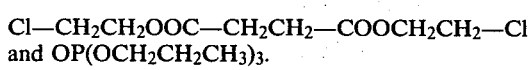

Cl—CH$_2$CH$_2$OOC—CH$_2$CH$_2$—COOCH$_2$CH$_2$—Cl
and OP(OCH$_2$CH$_2$CH$_3$)$_3$.

In the preferred form of the process according to the invention, there are used as the epoxide resin mentioned under (a) the compound of the formula

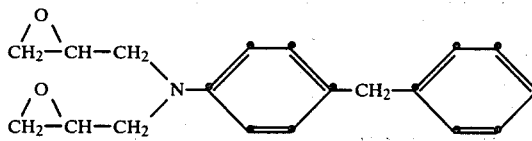

(N,N,N',N'-tetraglycidyl-methylenediamine)
as one of the polyamines mentioned under (b) one of the compounds of the formulae

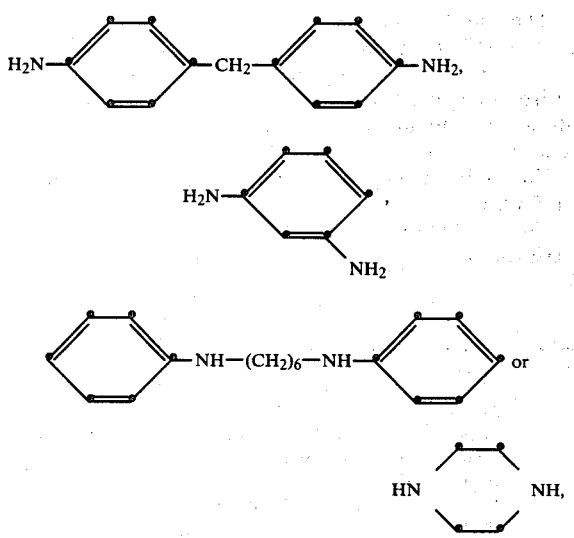

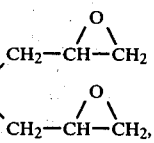

as one of the quaternising agents mentioned under (c) one of the compounds of the formulae

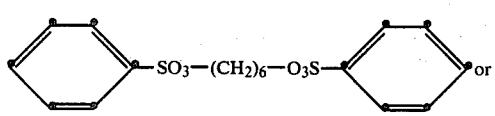

Cl—CH$_2$CH$_2$—OOC—(CH$_2$)$_4$—COO—CH$_2$CH$_2$—Cl
and (d) aluminium oxide as filler.

In a particularly preferred form of the process according to the invention, there are used as the epoxide resin mentioned under (a) the compound of the formula

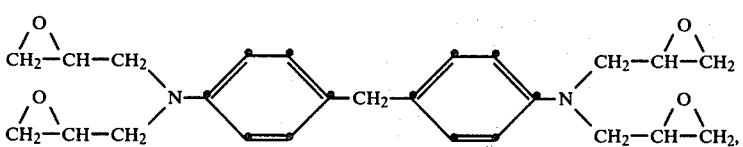

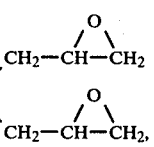

as one of the polyamines mentioned under (b) 4,4'-diaminodiphenylmethane, or a mixture of 4,4'-diaminodiphenylmethane, 4,4'-diamino-3-ethyl-diphenylmethane and 4,4'-diamino-3,3'-diethyl-diphenylmethane, as one of the quaternising agents mentioned under (c) bis-(β-chloroethyl)-adipic ester, and (d) aluminium oxide as filler.

All starting products usable in the process according to the invention are known, and it is therefore unnecessary here to describe them or in particular the manner of producing them.

To be mentioned as customary additives for plastics, which additives can be used in the process according to the invention, are in particular fillers (for example silica gel, quartz powder, powdered slate, MgCa-silicate powder, baryta powder and aluminium oxide powder), dyes and flexibilisers.

Further subject matter of the present invention is the use of the plastics produced by the process according to the invention as antistatic materials, particularly in electrical apparatus and plants. In the case of objects and structures of large surface area, there is largely avoided in a simple manner by this application for example an electrostatic charge. There is a need especially in modern direct current high-tension engineering for antistatic insulators which have no tendency to become contaminated by electrostatic deposition of dust particles.

The invention is further illustrated in the Examples which follow.

EXAMPLE 1

125 g of N,N,N',N'-tetraglycidyl-methylenedianiline having an epoxide equivalent weight of 133, 49.6 g of 4,4'-diaminodiphenylmethane and 135.6 g of bis-(β-chloroethyl)-adipic ester are well mixed together; the mixture is then melted at 80° C., degassed, poured into a mould of dimensions 150×150×4 mm and, by stepwise heating at 80° C., 100° C. and 120° C. (4 hours at each step), transformed into a hard moulded product, the properties of which are given in Table 1.

A small specimen of this product is pulverised and extracted with boiling water; there is found in the aqueous extract, by means of titration with silver nitrate solution, 8.2% of chloride ions; the chlorine content of the cured product not extracted is 11.0% (determination according to Wurzschmitt).

EXAMPLE 2

29.5 g of the epoxide resin used in Example 1, 13.3 g of 4,4'-diaminophenylmethane, 36.3 g of bis-(β-chloroethyl)-adipic ester and 120 g of aluminium oxide (particle size 1–30μ) are well mixed; the mixture is melted at 80° C., degassed, and converted as in Example 1 into a cured moulded product, the properties of which are summarised in Table 1.

EXAMPLE 3

30 g of the epoxide resin used in Example 1, 14 g of 4,4'-diaminodiphenylmethane and 56 g of hexamethylenebisbenzenesulfonic ester are well mixed; the mixture is melted at 80° C., degassed, and poured into a mould as in Example 1. By stepwise heating at 120° C., 140° C., 160° C. and 180° C. (2 hours at each step), there is formed from the melt a hard moulded product, the properties of which are summarised in Table 1. A small specimen of the product is pulverised, and extracted with boiling water; there is found in the aqueous extract, by titration with sodium hydroxide solution, 33.2% of benzenesulfonic acid (theoretical content: 42.3%).

Comparative Example 77.8 g of bisphenol-A diglycidyl ether (epoxide equivalent weight 194), 62 g of dichlorohexane and 91.2 g of 2,2',6,6'-tetrakis(dimethylaminomethyl-bisphenol-A are quickly mixed at 60° C.; the mixture is subsequently degassed, poured into a mould of dimensions 150×150×4 mm, and transformed, by stepwise heating at 60° C., 100° C. (2 hours) and 140° C. (12 hours), into a hard moulded product, the properties of which are given in Table 1; the specific current-flow resistance is $3.9 \cdot 10^{10}$ [$\Omega$.cm].

This comparative example shows that substances according to the U.S. Pat. No. 4,014,955 have indeed an increased conductivity compared with that of normal epoxide resins, that however the processing possibility (gelling time) and water absorption are considerably less favourable than in the case of the substances produced according to the invention.

TABLE 1

| Example No. | Flexural strength (N/mm$^2$)[1] | Dimensional stability under heat[2] (°C.) | Water absorption after 4 days in water at 23° C. (%) | Gelling time at 100° C. (min.) |
| --- | --- | --- | --- | --- |
| 1 | 36.6 | 71 | 0.12 | 34 |
| 2 | 30.4 | 69 | | |
| 3 | 30.8 | 86 | 2.89 | 14 |
| Comparative Example | 36 | 139 | specimen dissolved | 4.5 |

[1]VSM 77 103 (VSM = Verband Schweizerischer Maschinen-industrieller) (Association of Swiss Machine Manufacturers)
[2]ISO/R (ISO = International Standards Organisation)

EXAMPLES 4-21

The substances contained in Table 2 are mixed in a mortar as homogeneously as possible; in each case 7 g (with filled mixtures 10 g) are cured in small aluminium dishes (diameter 5.5 cm) in the given manner. Table 2 shows the mixture proportions, the curing conditions and the specific current-flow resistance.

The embodiment of Example 10 is most particularly preferred.

The starting substances in Table 2 have the following designations:

| | |
| --- | --- |
| Epoxide resin I | = the epoxide resin used in Example 1, |
| Epoxide resin II | = N,N,N',N'—tetraglycidyl-p-phenylenediamine, |
| Epoxide resin III | = epoxide resin based on 5,5-dimethylhydantoin, having an epoxide equivalent weight of 141, |
| Epoxide resin IV | = epoxide resin based on p-aminophenol, having an epoxide equivalent weight of 98, |
| Amine A | = the amine (4,4'-diaminodiphenylmethane) used in Example 1, |
| Amine B | = m-phenylenediamine, |
| Amine C | = ⟨☐⟩—NH—(CH$_2$)$_6$—NH—⟨☐⟩ |
| Amine D | = piperazine, |
| Amine E | = (CH$_3$)$_2$CHCH$_2$—NH—CH$_2$CH$_2$—NH—CH$_2$CH(CH$_3$)$_2$ |
| Amine F | = a mixture of 4,4'-diaminodiphenylmethane, 4,4'-diamino-3-ethyl-diphenylmethane and 4,4'-diamino-3,3'-diethyl-diphenylmethane, |
| Quaternising agent a | = the quaternising agent used in Example 3, |
| Quaternising agent b | = ⟨☐⟩—SO$_3$—CH$_2$—C(CH$_3$)$_2$—CH$_2$—O$_3$S—⟨☐⟩ |
| Quaternising agent c | = trimethylphosphate, |
| Quaternising agent d | = ClCH$_2$CH$_2$OOC—(CH$_2$)$_4$—COOCH$_2$CH$_2$Cl, |
| Quaternising agent e | = ClCH$_2$CH$_2$OOC—CH$_2$CH$_2$—COOCH$_2$CH$_2$Cl. |

TABLE 2

| Ex. No. | Mixture of epoxide resin (mol) | Mixture of amine (mol) | Mixture of quaternising agent (mol) | Filler wt. % relative to the total mixture | Curing | Specific current-flow resistance at 23° C. ($\Omega \cdot cm$) |
|---|---|---|---|---|---|---|
| 4 | I (0.035) | A (0.055) | a (0.07) | — | 120/140/160/180° C. 2h at each step | $8.5 \cdot 10^{11}$ |
| 5 | I (0.035) | A (0.055) | a (0.07) | 60 quartz powder | 120/140/160/180° C. 2h at each step | $1.8 \cdot 10^{11}$ |
| 6 | I (0.035) | A (0.055) | b (0.07) | 60 Al oxide neutral | 80/100/120° C. 4h at each step | $1.5 \cdot 10^{11}$ |
| 7 | I (0.066) | A (0.066) | c (0.06) | — | 80/120/140/160/180° C. 2h at each step | $1.2 \cdot 10^{10}$ |
| 8 | I (0.01) | A (0.01) | d (.02) | — | 80–120° C. | $5 \cdot 10^{10}$ <br> $8.3 \cdot 10^{9}$* |
| 9 | I (0.01) | A (0.01) | d (0.02) | 60 Al oxide neutral | 80/100/120° C. 4h at each step | $3.3 \cdot 10^{9}$ |
| 10 | I (0.01) | A (0.01) | d (0.02) | 60 Al oxide III | 120/130/140/150° C. 2h at each step | $2.1 \cdot 10^{8}$ |
| 11 | I (0.01) | B (0.01) | d (0.02) | — | 100 and 120° C. 6h at each step | $6.0 \cdot 10^{9}$ |
| 12 | I (0.01) | B (0.01) | d (0.02) | 60 Al oxide neutral | 100 and 120° C. 6h at each step | $6.6 \cdot 10^{8}$ |
| 13 | II (0.01) | B (0.01) | d (0.02) | — | 100 and 120° C. 4h at each step | $2.3 \cdot 10^{10}$ |
| 14 | II (0.01) | B (0.01) | d (0.02) | 60 silica gel | 100 and 120° C. 4h at each step | $5.8 \cdot 10^{8}$ |
| 15 | I (0.01) | C (0.015) D (0.005) | e (0.03) | — | 60/80/100/120° C. 4h at each step | $8.6 \cdot 10^{11}$ |
| 16 | I (0.01) | E (0.02) | e (0.03) | — | 1h at 80° C. + 2h at 120° C. + 4h at 140° C. + 2h at 160° C. | $8.1 \cdot 10^{11}$ |
| 17 | I (0.01) | C (0.005) D (0.015) | d (0.03) | — | 6h at 60° C. then 80/100/120 140° C. with 2h at each step | $3.4 \cdot 10^{8}$ |
| 18 | III (0.04) | B (0.04) | d (0.08) | — | 80/100/120° C. 4h at each step | $1.3 \cdot 10^{9}$ |
| 19 | IV (0.053) | A (0.04) | d (0.06) | — | 80/100/120° C. 4h at each step | $4.3 \cdot 10^{10}$ |
| 20 | IV (0.053) | A (0.04) | d (0.06) | 60 Al oxide neutral | 80/100/120° C. 4h at each step | $6.3 \cdot 10^{9}$ |
| 21 | I (0.01) | F (0.01) | d (0.02) | — | 80/100/120° C. 4h at each step | $8.8 \cdot 10^{10}$ <br> $3.2 \cdot 10^{9}$** |

*after 1 day in water at 23° C.
**after 4 days in water at 23° C.

What is claimed is:

1. A process for producing crosslinked plastics which comprises reacting
   (a) an epoxide resin containing at least one N-glycidyl group in the molecule,
   (b) a primary and/or secondary, aromatic, aliphatic or heterocyclic polyamine, and
   (c) a quaternising agent selected from the group consisting of aromatic and aliphatic polysulfonic esters, halogen-free organic phosphoric esters, and organic compounds which contain at least 2 chlorine or bromine atoms in the molecule, and which are free from groups of the formula —COOZ in which Z is hydrogen or a metal atom,
   (d) optionally in the presence of customary additives for plastics, particularly fillers, and
   (e) optionally in the presence of organic solvents,
at a temperature of 50° to 150° C., there being in the starting reaction mixture, to 1 equivalent of glycidyl groups, 0.5 to 1.5 equivalents of hydrogen atoms of the polyamine stated under (b) which are bound to nitrogen, and, to 1 gram atom of N in the reaction mixture, a maximum of 1 gram equivalent of a quaternising agent.

2. A process according to claim 1, wherein in the starting reaction mixture there is, to 1 equivalent of glycidyl groups, 1 equivalent of hydrogen atoms of the polyamine stated under (b) which are bound to nitrogen, and, to 1 gram atom of N in the reaction mixture, 1 gram equivalent of a quaternising agent.

3. A process according to claim 1, wherein there is used, as the epoxide resin stated under (a), a compound of one of the formulae I–II

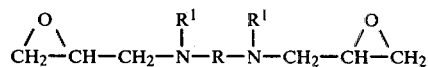 (I)

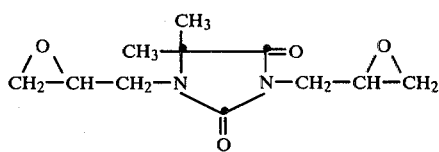 (Ia)

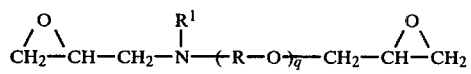 (II)

in which R is an aliphatic radical having 2 to 15 C atoms, or an unsubstituted or substituted aromatic radical having all together 6 to 15 C atoms, $R^1$ is a glycidyl group, an aliphatic radical having 1 to 10 C atoms, or an unsubstituted or substituted aromatic radical having all together 6 to 10 C atoms, and q is the number 0 or 1.

4. A process according to claim 1, wherein there is used, as one of the polyamines stated under (b), a compound of the formula III $R^2$—$(NH_2)_n$ (III), a compound of the formula IV

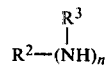 (IV)

or a compound of the formula V

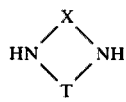 (V)

in which n is one of the numbers 2, 3 or 4, $R^2$ is an n-valent aliphatic radical having 2 to 15 C atoms, an n-valent, unsubstituted or substituted, aromatic radical having all together 6 to 15 C atoms, or an unsubstituted or substituted heterocyclic radical having all together 3 to 15 C atoms, $R^3$ is an aliphatic radical having 1 to 10 C atoms, or an unsubstituted or substituted aromatic radical having all together 6 to 10 C atoms, and X and T are such organic radicals that can form with the two N atoms a 5- or 6-membered heterocyclic ring.

5. A process according to claim 1, wherein there is used, as one of the quaternising agents stated under (c), a compound of the formula VI

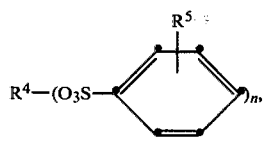 (VI)

a compound of the formula VII

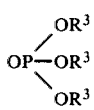 (VII)

or a compound of the formula VIII $R^2$—$(COO-R^6-Cl)_n$ (VIII)

in which n is one of the numbers 2, 3 or 4, $R^5$ is hydrogen, an aliphatic radical having 1 to 10 C atoms, or an unsubstituted or substituted aromatic radical having all together 6 to 10 C atoms, $R^2$ is an n-valent aliphatic radical having 2 to 15 C atoms, or an n-valent, unsubstituted or substituted, aromatic radical having all together 6 to 15 C atoms, or an unsubstituted or substituted heterocyclic radical having all together 3 to 15 C atoms, $R^3$ is an aliphatic radical having 1 to 10 C atoms, or an unsubstituted or substituted aromatic radical having all together 6 to 10 C atoms, $R^4$ is an n-valent aliphatic radical having 2 to 12 C atoms, and $R^6$ is an aliphatic radical having 2 to 8 C atoms, or an unsubstituted or substituted cycloaliphatic radical having all together 5 to 8 C atoms.

6. A process according to claim 1, wherein there is used, as the epoxide resin stated under (a), the compound of the formula

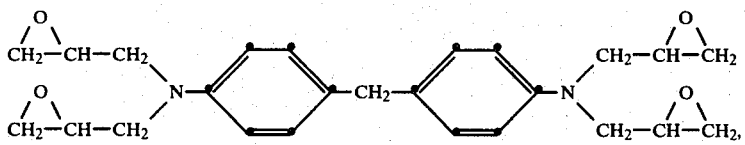

as one of the polyamines stated under (b), one of the compounds of the formulae

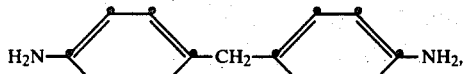

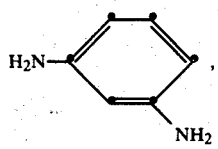

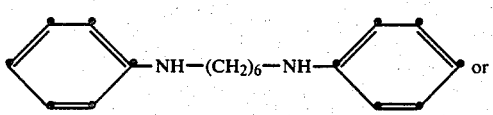

as one of the quaternising agents stated under (c), one of the compounds of the formulae

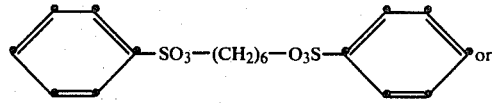

Cl—CH₂CH₂—OOC—(CH₂)₄—COO—CH₂CH₂—Cl and (d) aluminium oxide as filler.

7. A process according to claim 1, wherein there is used, as the epoxide resin stated under (a), the compound of the formula

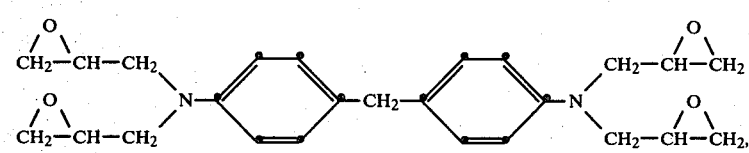

as one of the polyamines stated under (b), 4,4'-diaminodiphenylmethane, or a mixture of 4,4'-diaminodiphenylmethane, 4,4'-diamino-3-ethyldiphenylmethane and 4,4'-diamino-3,3'-diethyldiphenylmethane, as one of the quaternising agents stated under (c) bis-(β-chloroethyl)-adipic ester, and (d) aluminium oxide as filler.

8. A process according to claim 7, wherein there is used, as the epoxide resin stated under (a), the compound of the formula

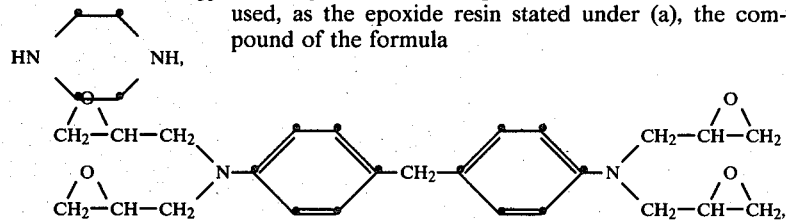

as one of the polyamines stated under (b), 4,4'-diaminodiphenylmethane, as one of the quaternising agents stated under (c), bis-(β-chloroethyl)-adipic ester, and (d) aluminium oxide as filler.

9. A process according to claim 1, wherein the reaction is performed in the absence of organic solvents.

* * * * *